Jan. 28, 1969
W. B. KREBS
3,424,207
SHUTTLELESS WIRE LOOM
Filed March 31, 1967
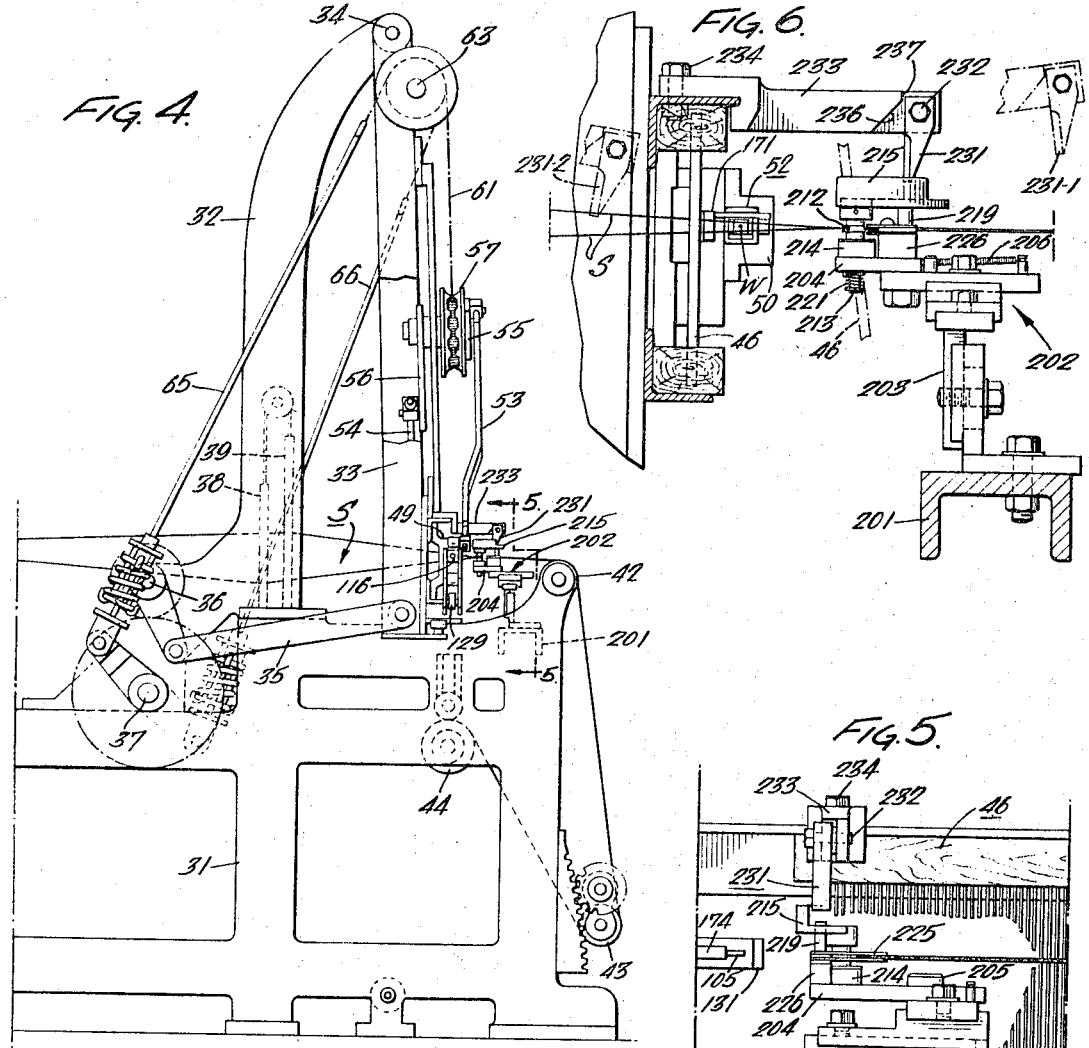
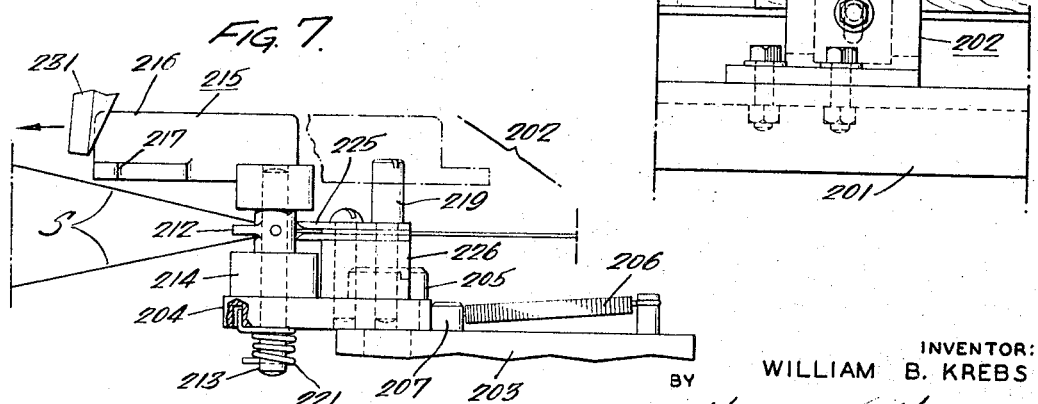
INVENTOR:
WILLIAM B. KREBS
BY Howson & Howson
ATTYS.

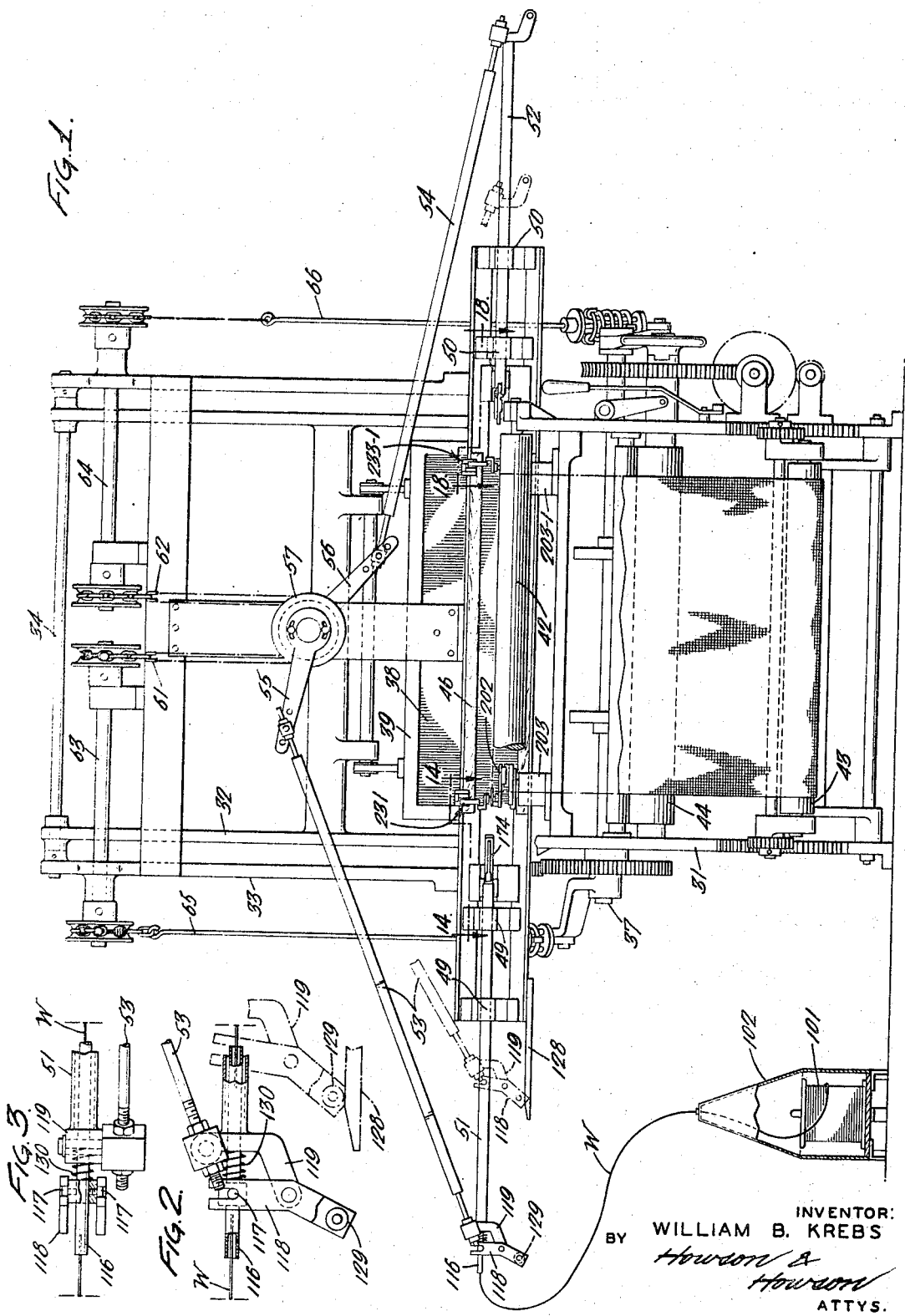

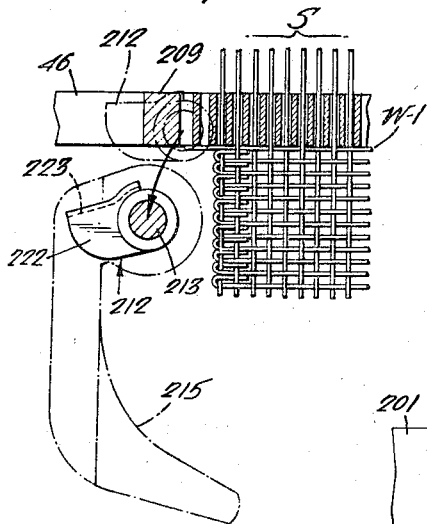
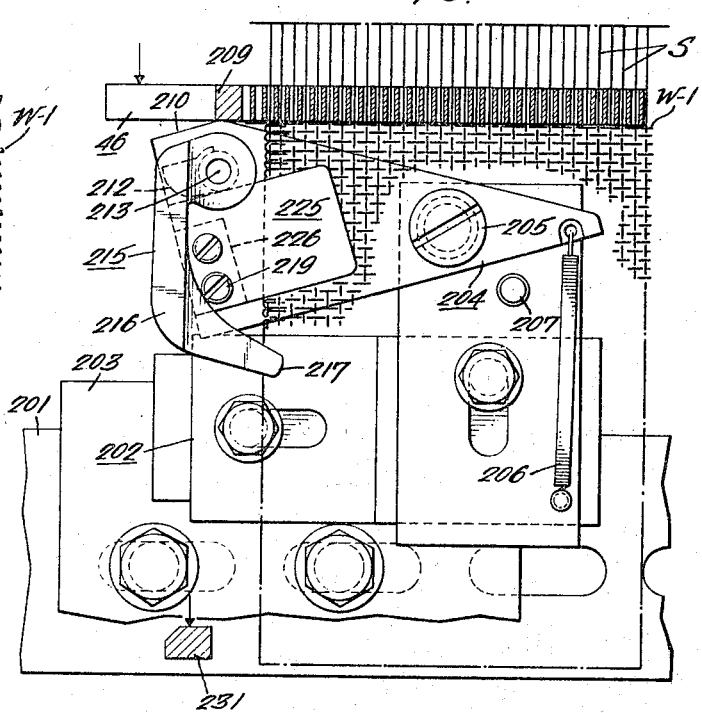
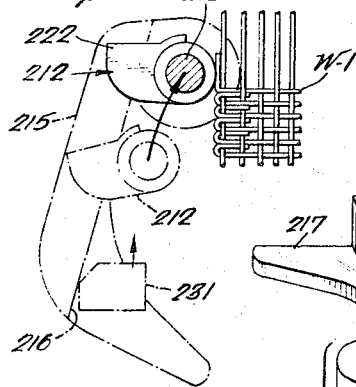
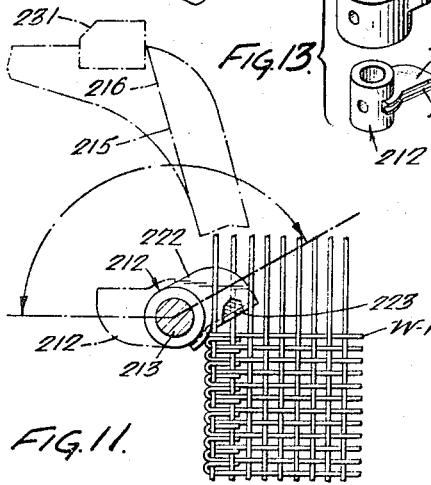
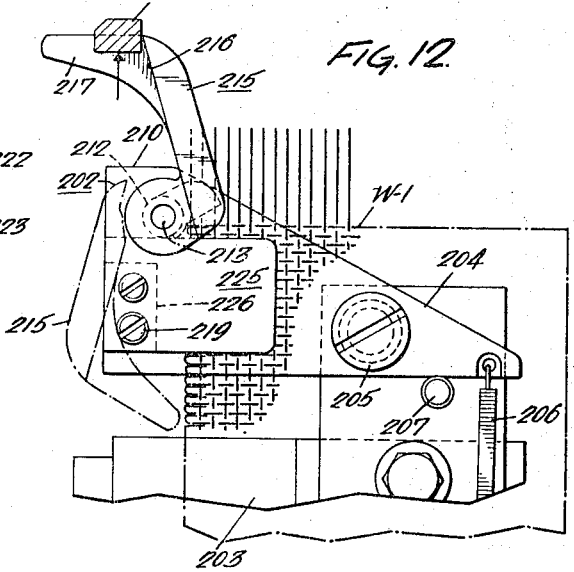

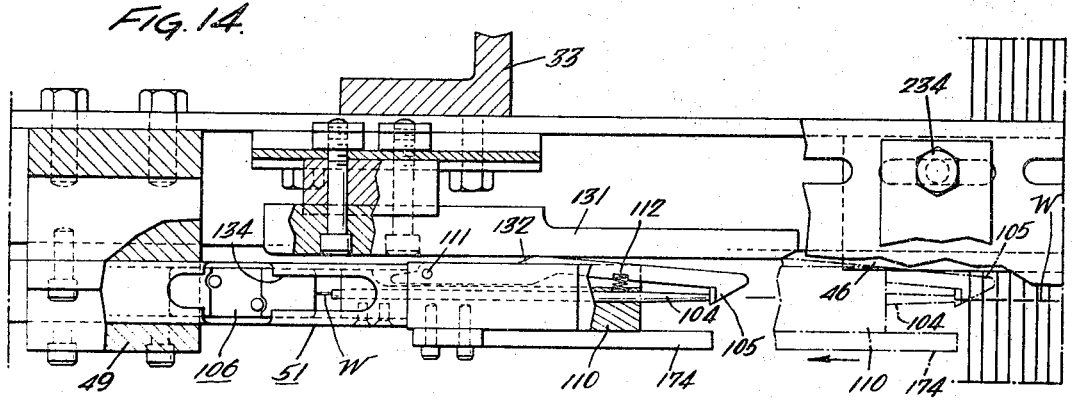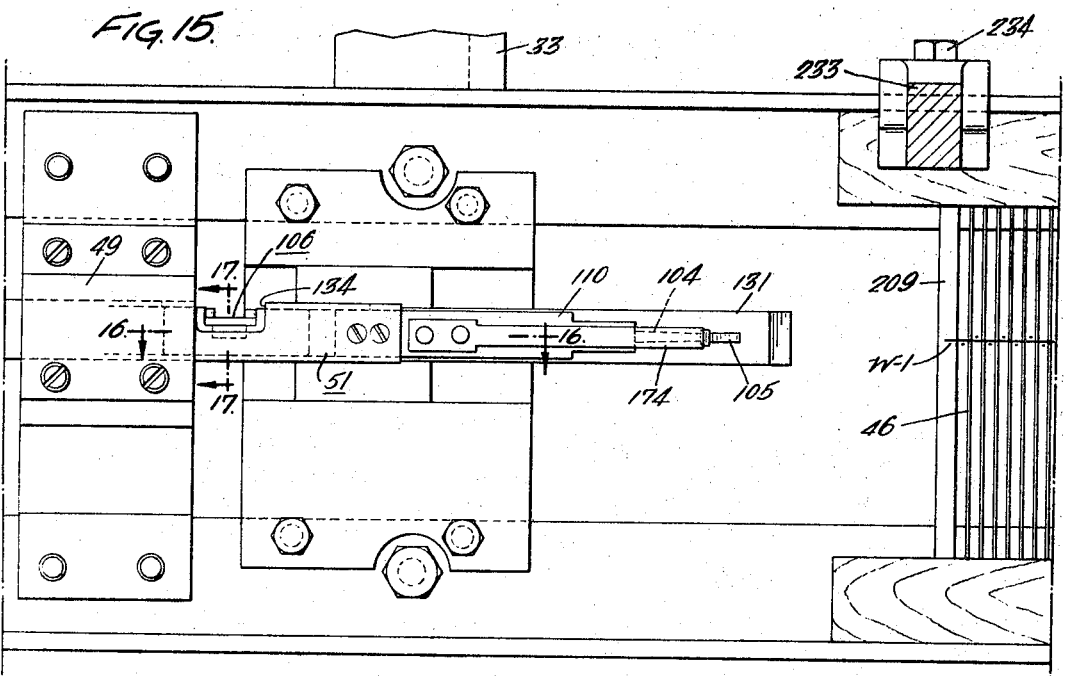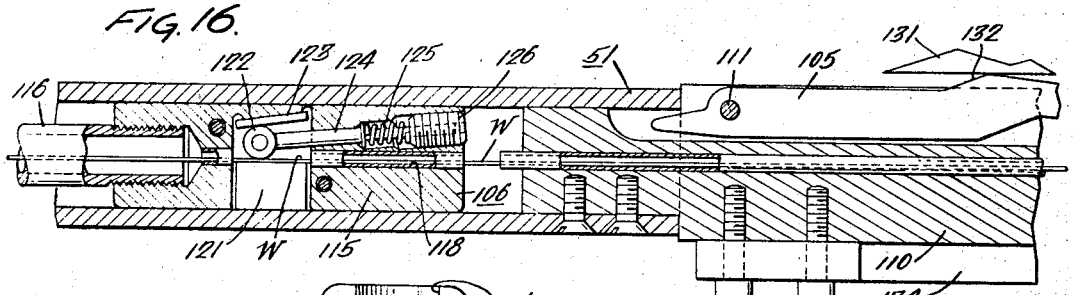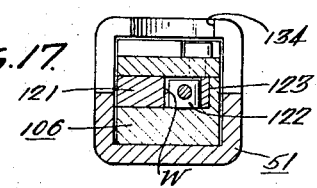

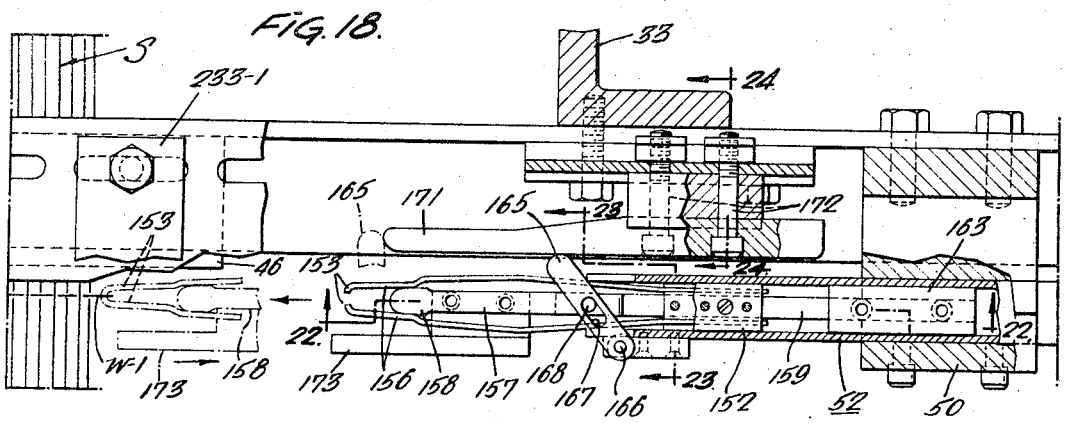
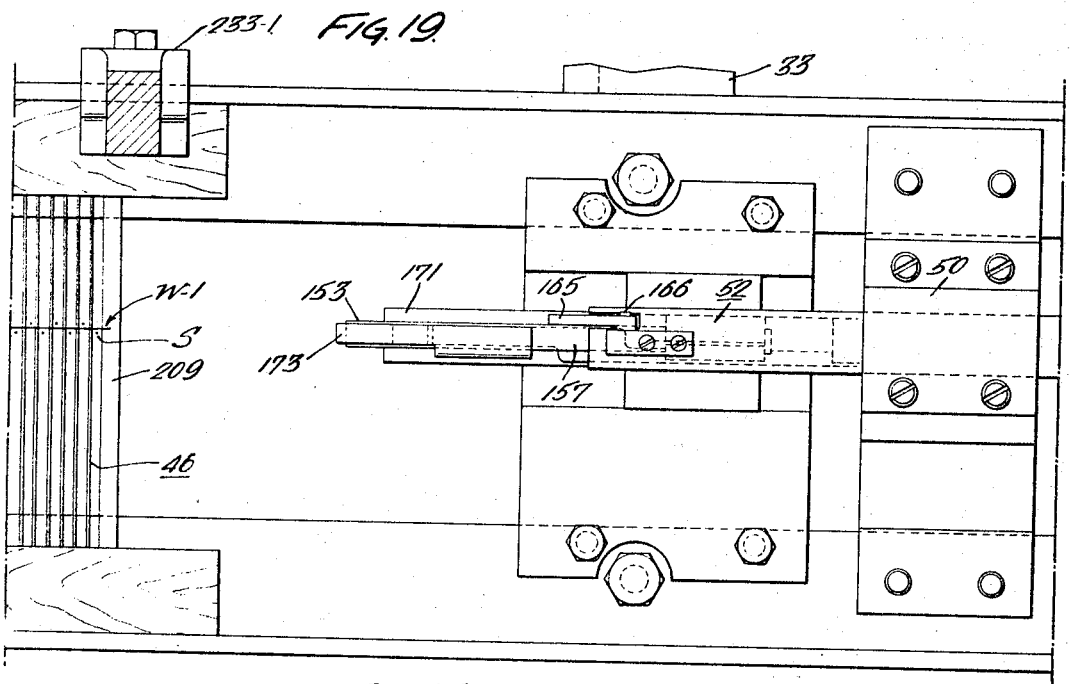
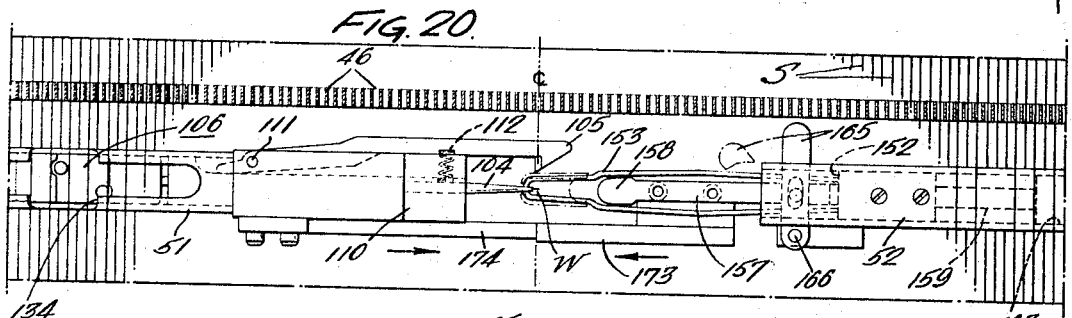
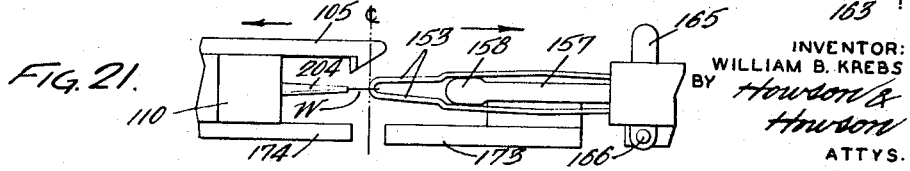

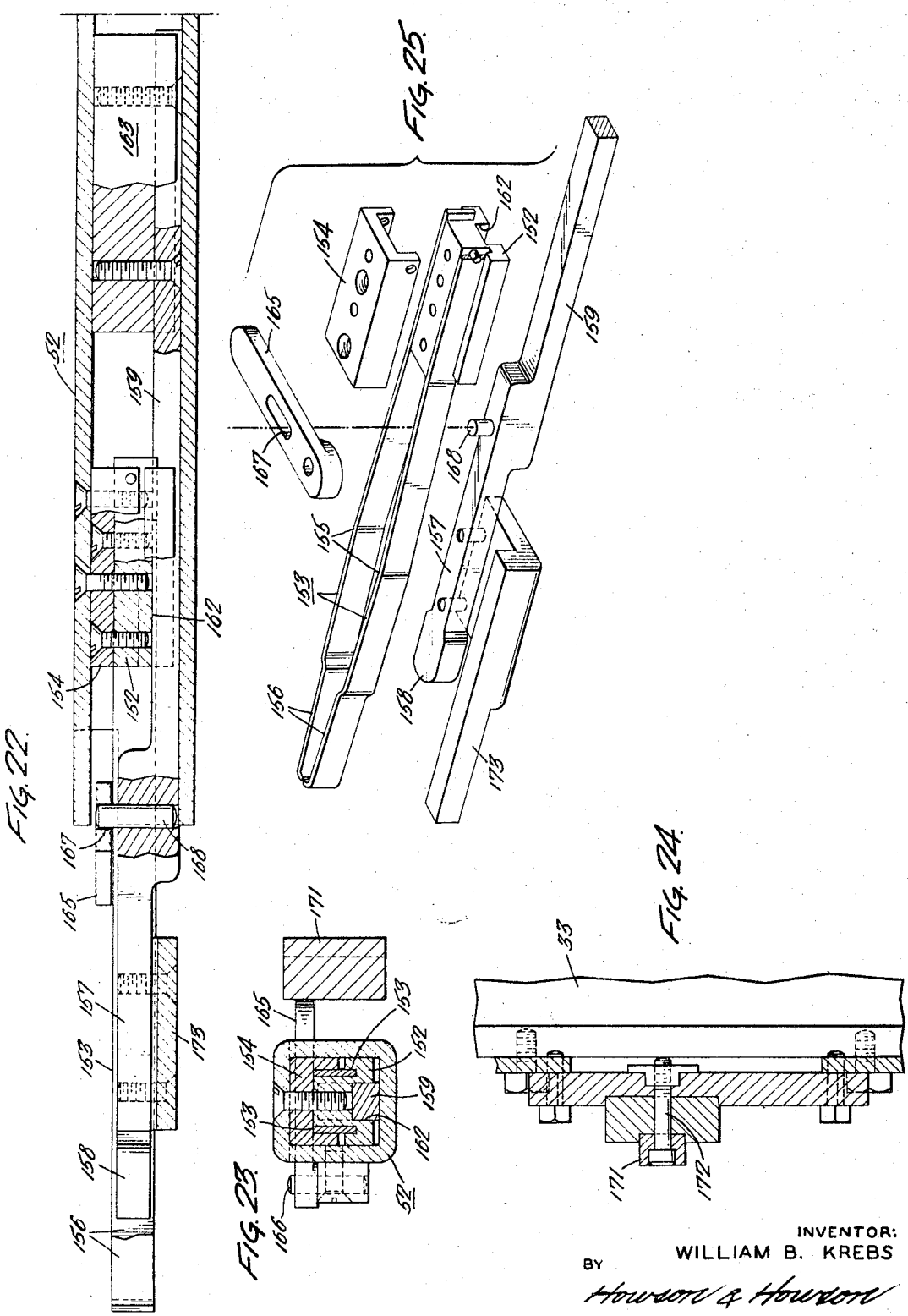

United States Patent Office 3,424,207
Patented Jan. 28, 1969

3,424,207
SHUTTLELESS WIRE LOOM
William B. Krebs, Hanover, Pa., assignor to Keystone-Seneca Wire Cloth Company, Hanover, Pa., a corporation of Pennsylvania
Filed Mar. 31, 1967, Ser. No. 627,409
U.S. Cl. 140—7                                 22 Claims
Int. Cl. B21f *27/02;* D03d *47/18, 47/28*

ABSTRACT OF THE DISCLOSURE

A loom for weaving cloth from strands of wire in which the conventional shuttle is eliminated and weft wires of the cloth are fed through the shed of the loom as individual strands by modification of the conventional shuttle carriers. One of the carriers is provided with a feeder for feeding a strand of wire to the center of the shed in the loom and the other carrier is provided with a gripper for engaging and pulling the strand the rest of the way through the shed. After the weft is inserted in place, both ends are tucked into the edge of the wire cloth to form a selvage.

---

The present invention relates to looms for weaving cloth from strands of wire, and more particularly, to a novel loom in which the conventional shuttle for the weft wire is eliminated.

In weaving mills utilizing conventional shuttle-type looms, a single operator can attend only a limited number of looms, depending upon their width because of the frequent shut-down of the looms necessary for replenishing the shuttles. Because of the stiff springy nature of the wire used in weaving wire cloth, it has not been practical to employ automatic shuttle changers in wire looms, and recent efforts have been directed toward the development of wire looms which eliminate the use of a shuttle, wherein the weft wire is fed to the loom from a stationary supply adjacent the loom and strands of weft wire are passed individually through the shed of the loom, their ends cut, and the cut ends tucked into the cloth to form a selvage.

A primary disadvantage of the new looms of this character is their high cost and their complicated control mechanism for feeding the proper length of wire through the shed, and for tucking the ends of the wire into the cloth to form the selvage. The complicated controls and mechanisms embodied in looms of this character require substantial retraining of the operating personnel, and when the breakdown occurs, substantial time is lost in locating the faulty mechanism or control because of the highly complicated nature thereof. Futrhermore, the life of conventional looms is substantial and conversion to shuttleless looms requires the mill to scrap or otherwise dispose of a substantial amount of equipment which normally is still in working order and which has considerable useful life remaining.

With the foregoing in mind, the present invention provides mechanism which may be mounted on a conventional shuttle loom to replace the shuttle thereof and enable the conventional shuttletype loom to be converted into a shuttleless loom, thereby obtaining the economy of shuttleless operation without the substantial investment in entirely new looms and without the loss entailed in placing shuttle-type looms out of production and disposing of them.

The present invention utilizes to a substantial extent the motions and the parts of the conventional shuttle-type looms, thereby reducing the need for retraining loom operations and loom fixers.

The present invention also minimizes the additional controls applied to the loom by using to the geratest extent the motions of the conventional loom to actuate and initiate the operation of the additional parts needed to render the loom shuttleless.

The present invention provides a loom which operates shuttleless in an efficient and effective manner, obtaining the advantages of shuttleless operation.

All of the objects of the invention are more fully set forth hereinafter with reference to the accompanying drawings, wherein:

FIG. 1 is a view in front elevation of a shuttleless wire loom embodying the present invention with the weft insertion carriers in their outer limit positions;

FIG. 2 is an enlarged fragmentary view showing the outer or left-hand end of the wire-feeding carrier shown in FIG. 1;

FIG. 3 is a fragmentary plan view with a portion broken away of the structure shown in FIG. 2;

FIG. 4 is a view in side elevation of the loom shown in FIG. 1 with the lay frame and its reed in an intermediate forward position;

FIG. 5 is an enlarged fragmentary sectional view taken on the line 5—5 of FIG. 4 showing the weft end tucking mechanism thereof;

FIG. 6 is a fragmentary view of the structure shown in FIG. 5 as seen from the left-hand side thereof, with the forward and rearward limit positions of the reed indicated in phantom lines;

FIG. 7 is an enlarged fragmentary view of structure shown in FIG. 6 with the reed in a rearward intermediate position;

FIG. 8 is a plan view of the tucking mechanism shown in FIG. 6 with the reed shown in its forward limit position;

FIG. 9 is a horizontal fragmentary sectional view at an enlarged scale showing the tucking mechanism in the position of FIG. 8;

FIG. 10 is a fragmentary view similar to FIG. 9 showing the tucking mechanism in a position subsequent to the position shown in FIG. 9;

FIG. 11 is a view similar to FIGS. 9 and 10 showing the tucking mechanism in a further position;

FIG. 12 is a fragmentary view similar to FIG. 8 showing the tucking mechanism in a position corresponding to that shown in FIGS. 7 and 11;

FIG. 13 is a detached perspective view of the tucking element and its operator shown in FIGS. 8 through 12;

FIG. 14 is an enlarged horizontal sectional view taken on the line 14—14 of FIG. 1 showing the mechanism of the inner right-hand end of the wire-feeding carrier;

FIG. 15 is a front view of the structure shown in FIG. 14;

FIGS. 16 and 17 are enlarged sectional views taken on the lines 16—16 and 17—17 of FIG. 15;

FIG. 18 is an enlarged horizontal sectional view taken on the line 18—18 of FIG. 1 showing the mechanism of the inner left-hand end of the wire-pulling carrier;

FIG. 19 is a front view of the structure shown in FIG. 18;

FIG. 20 is a view similar to FIGS. 14 and 18 respectively but with the carriers in their inner limit positions, showing the relationship of their mechanisms after they meet at the center of the shed of the loom;

FIG. 21 is a fragmentary view similar to FIG. 20 showing the relationship of these mechanisms at a point subsequent to the position of FIG. 20;

FIGS. 22, 23, and 24 inclusive are enlarged sectional views taken respectively on the lines 22—22, 23—23, and 24—24 of FIG. 18; and FIG. 25 is an exploded perspective view of the parts shown in FIGS. 22 and 23.

Referring now to the drawings, the loom illustrated therein comprises a main frame 31 having a superstructure 32 which pivotally supports a lay frame 33 for swinging movement on a shaft 34. The lay frame 33 is caused to travel between forward and rearward limit positions by drive levers 35 driven from a lay shaft 36 which is geared to a main cam shaft 37 on the main frame 31. The main uam shaft 37 mounts cams and followers (not shown) for driving heddle frames 38 and 39 which displace the warps to form a shed S through which the strands of weft wire W are inserted. The wire cloth woven on the loom is drawn off over a breast roll 42 under a tension roll 43 and around a rewind roll 44 in conventional manner.

As shown in FIGS. 5 and 6, the lay frame 33 mounts the conventional reed 46 which beats up the weft W inserted in front of the reed into the fell of the cloth at the forward end of the shed S. The weft insertion mechanism of the loom is also carried by the lay frame 33 and includes a wire feeding carrier 51 and a wire-pulling carrier 52 slidably mounted in guide bearings 49 and 50 for reciprocating movement toward and away from the center of the shed. The carriers 51 and 52 are similar to the conventional shuttle rods of the conventional shuttle-type looms. The carriers 51 and 52 are displaced by carrier arms 53 and 54 respectively connected to cranks 55 and 56 keyed to an oscillating center sheave 57 mounted centrally in the lay frame. The oscillating center sheave 57, in turn, is driven by chains 61 and 62 connected to chain shafts 63 and 64 which are oscillated by connections 65 and 66 to the main cam shaft 37. The cranks 55 and 56 are adjustably mounted on the center sheave 57 to accommodate adjustments in timing thereof and the carrier arms 53 and 54 are likewise adjustable on the cranks 55 and 56 to enable variation in the throw.

In the operation of the loom, the shed S is formed in open position when the lay frame is at its rearward limit position. When the shed is opened, the carriers 51 and 52 are projected inwardly so as to meet at the center of the shed. As the lay frame 33 travels forwardly, the carriers 51 and 52 are retracted from the shed, leaving a strand of weft wire therein, and the forward travel of the lay frame 33 causes the reed 46 to beat up the weft into the fell of the cloth. Upon retraction of the carriers as the lay frame travels forwardly, the heddles 38 and 39 change the shed to retain the weft in position at the fell of the wire cloth. Rearward travel of the lay frame withdraws the reed 46 from the fell and as the new shed is opened, the carriers 51 and 52 are again projected inwardly toward the center of the shed to meet at the center of the shed when the lay frame is in its rearward limit position. This action is repeated continuously with a change of shed occurring at each beat-up of the reed against the fell.

The foregoing description is equally applicable to the conventional shuttle-type loom as it is to be the shuttleless loom of the present invention. In accordance with the present invention, the motions accompanying the conventional movement of a shuttle-type loom are utilized to operate the novel mechanisms of the shuttleless loom of the present invention. By doing this, it is unnecessary to add additional cams to the cam shaft or to provide separate controls for operating the novel mechanisms of the present invention.

*Weft wire feeding and laying-in*

The weft wires W are fed through the shed S from a continuous length of wire, for example from a stationary supply spool 101 mounted adjacent the loom in a supply housing 102. The wire is placed into the shed by the wire-feeding carrier 51 and wire-pulling carrier 52 and is severed by the wire-feeding carrier as the latter is retracted to a position beyond the shed. The position of severing by the wire-feeding carrier determines the projection of the tail end of the weft from the left-hand side of the shed. The projection of the weft from the right-hand side of the shed is determined by the point at which the wire-pulling carrier releases the wire after it is pulled through the shed. Wire-feeding means is incorporated into the carrier to predetermine the length of wire which is gripped by the wire-pulling carrier 52 so as to thereby accurately control the length of the tail of weft projecting from the shed at the right-hand side. The wire-feeding mechanism in the carrier 51 also insures proper tension on the wire as it is drawn through the shed to prevent the formation of slack and mispicks.

With the foregoing in mind, the wire-feeding carrier 51 includes at its right-hand or head end a nozzle member 104 fixed to the carrier (see FIGS. 1, 14–17, and 20). A shear 105 on the carrier 51 cooperates with the tip of the nozzle to sever the weft wire at the left-hand side of the shed. The carrier 51 is hollow in form and slidably receives therein for longitudinal displacement a wire feeder assembly 106. The feeder assembly 106 has a central bore through which the wire is threaded within the carrier 51 and from which the wire passes outwardly through the nozzle 104. When the head end of the carrier 51 is within the shed S, the shear 105 is displaced out of registry with the tip of the nozzle 104 so as to permit the feeder assembly 106 to advance the weft wire out through the nozzle 104 so that a tail of predetermined length projects from the tip of the nozzle when the head end of the wire-feeding carrier 51 reaches the center of the shed (see FIG. 20). To pull the wire the remaining way through the shed, the wire-pulling carrier 52 is provided with jaws 153 at its leading end which are adapted to engage over the nozzle and to grip the projecting tail of weft wire upon initial retractive movement at the center of the shed. Retraction of the two carriers 51 and 52 pulls the weft wire through the shed. When the right hand end of the wire is at the right-hand side of the shed and a sufficient tail projects from the side of the shed, the jaws are opened to release the wire. At the same time, on the left-hand side of the shed, the shear 105 is actuated to sever the weft wire leaving the proper length of tail projecting from the side of the shed for forming the selvage, as described hereinafter.

Referring now to the wire feed carrier 51, in the present instance, it comprises a length of square tubing having a mounting block 110 at its forward end in which the tubular nozzle 104 is mounted. The mounting block also pivotally mounts the shear 105, as indicated at 111 and a spring bias is provided at 112 (see FIG. 14) to urge the shear out of registry with the open end of the nozzle 104. The feeder assembly 106 is slidably mounted in the carrier 51 rearwardly of the mounting block 110. The feeder assembly 106 comprises a feeder block 115 at the forward end and a rearwardly-extending feeder tube 116. As shown in FIGS. 2 and 3, the feeder tube 116 projects outwardly beyond the trailing end of the carrier 51 and is provided with outwardly-projecting trunnions 117 to engage a yoke 118 pivoted to the carrier by a bracket 119 (see FIG. 2). The feeder block 115, as shown in FIGS. 16 and 17, includes a wire clamp and tensioner which permits forward movement of the wire relative to the feeder block but prevents rearward movement of the wire relative to the block.

The wire clamp and tensioner includes a clamp plate 121 of wear-resistant material engaging one side of the wire W passing through the bore 118 of the feeder block 115. A clamping roller 122 engages against the opposite side of the wire W and is urged thereagainst by a bearing plate 123 and a push rod 124 which urges the roller 122 rearwardly under the bias of a spring 125. The biasing force of the spring is regulated by a set screw 126 threaded into the feeder block 115. When sufficient tension is exerted upon the wire W in a forward direction, to overcome the bias of the spring 125, the roller 122 may move forwardly to permit travel of the wire between the roller 122 and the clamp plate 121. However, if insufficient pull is exerted on the wire W, to overcome the bias of the spring 125, the roller 122 clamps the wire against the plate 121. The plates 121 and 123 and the roller 122 are composed of a hard wear-resistant material, for example carbide steel, and the floating action of the roller 122 insures firm clamping of the wire.

As stated above, when the lead end of the carrier 51 is within the shed, the shear 105 is displaced out of registry with the nozzle opening by the spring 112 and the feeder operates to project a short tail of the wire forwardly through the nozzle. To accomplish this feeding motion, a feeder cam 128 is mounted on the lay frame 33 to engage a follower 129 in the yoke 118 to pivot the yoke on the bracket and advance the feeder tube 116 and with it, the feeder block 115 forwardly relative to the carrier 51. Since there is relatively no drag on the wire W, the clamping roller 122 has clamped the wire against the plate 121 and the advance of the feeder block 115 advances the wire W through the nozzle 104 so that a small tail projects from the tip of the nozzle as shown in FIG. 20. The cam 128 is positioned on the lay frame 33 so that when the carrier 51 is advanced by the carrier arm 53, the feeder is automatically displaced forwardly when the leading end of the carrier 51 is within the shed and before the carrier reaches the center of the shed. In this manner, the nozzle is provided with a projecting tail of wire when it reaches the center of the shed, as indicated in FIG. 20.

At the center of the shed, the wire gripper on the wire-pulling carrier 52 engages over the nozzle 104, and as the carriers 51 and 52 are separated, the grippers grip the projecting tail of wire and pull the wire through the shed. The grippers of the wire-pulling carrier 52 have sufficient force to apply sufficient tension to the wire to overcome the bias of the spring 125 in the wire feeder so that the feeder may retract with the carrier tube 51 under the action of the carrier arm 53.

Before the end of the nozzle 104 passes out of the shed, the follower 129 disengages the cam 128 and a spring 130 bearing against the yoke 118 retracts the feeder from the nozzle. It should be noted that the retractive force supplied by the spring 130 is sufficient to overcome the tensioning force applied to the wire by the roller 122 while the wire is gripped by the gripper jaws so that the feeder is displaced to the left within the tube 51.

Thereafter, when the nozzle passes out of the shed, the shear 105 is actuated to clip the wire adjacent the shed, leaving a short tail for the formation of the selvages described hereinafter. To this end, as shown in FIGS. 14 and 15, a shearing cam 131 is mounted on the lay frame 33 adjacent the side of the shed. As shown in FIG. 14, the cam 131 engages the upper surface of the shear 105 to displace it from the retracted position shown in FIG. 20 to the advanced position shown in FIG. 14 where the shear is in registry with the tip of the nozzle 104. To insure the proper length of tail at the left-hand side of the shed, the upper surface of the shear 105 is provided with a projecting portion 132 which is adapted to engage the cam 131. The cam 131 may therefore be accurately adjusted to actuate the shear 105 at the precise point necessary to provide the desired length of tail. Thus, it is apparent that the retraction of the carrier 51 automatically operates the shear 105 at the proper point when the cam 131 is properly adjusted on the lay frame 33. It should be noted that a cutout is provided in the carrier 51 at 134 in the area of the feeder block 115 to enable the operator to inspect the operation of the feeder block and to make any necessary adjustments in the cam 128 to effect the proper feeding of the wire through the nozzle while the carrier is within the shed.

In accordance with another feature of the invention, the wire grippers of the wire-pulling carrier 52 are operated automatically by the displacement of the carrier 52. The wire-pulling carrier 52 comprises a length of square tubular stock having at its forward end a mounting guide 152, as shown in FIGS. 18–25, which supports a pair of leaf spring gripper jaws 153 by means of a retainer 154.

The gripper jaws 153 are bowed outwardly in their central portion as indicated at 155 and are offset inwardly toward one another at their leading end as indicated at 156. A jaw-opening cam 157 has a head 158 positioned intermediate the jaws 153 and a slide portion 159 extending rearwardly through a guideway 162 in the guide member 152 and terminates in a slide block 163 which is slidable longitudinally in the tubular carrier 52.

In operation of the wire-gripping jaws, when the cam 157 is retracted, the jaws 153 are free to close under their own bias to grip the wire positioned therebetween. When the cam 157 is advanced to position the head portion 158 intermediate the offset portions 156 of the jars 153, the jaws are forced apart a sufficient distance to enable them to engage over the nozzle 104 of the wire-feeding carrier 51. To advance the cam 157, a cam lever 165 is pivoted to the carrier 52 as indicated at 166 in FIG. 18. The lever 165 is provided with an elongated slot 167 centrally therein which engages an upstanding lug 168 on the cam 157 to displace the cam forwardly when the lever is pivoted in the clockwise direction as seen in FIGS. 18 and 20.

As stated above, the gripper jaws are opened when the leading end of the carrier 52 passes out of the shed S during the retractive movement of the carrier 52 so as to leave a tail of wire of the desired length projecting from the side of the shed. To accomplish this operation, a jaw-opening actuator 171 (see FIGS. 18 and 23) is positioned on the lay frame 33 to engage the free end of the lever 165 at the proper point after passage of the carrier 52 out of the shed. The actuator 171 is mounted on the lay frame 33, as indicated at 172, and when the actuator is properly adjusted on the lay frame, the jaws will open automatically when the wire-pulling carrier 52 withdraws from the shed, leaving the proper length of tail of weft wire projecting from the shed.

The cam head 158 maintains the jaws open until the cam 157 positively displaced rearwardly. Therefore, the jaws remain in their open position until the carrier 52 reaches the center of the shed. To displace the cam rearwardly and retract the head 158 from between the offset portions 156 of the jaws, a cam operator 173 is mounted on the cam 157 to project forwardly therefrom alongside the jaws 153. The cam operator 173 is adapted to be engaged by a jaw-closing actuator 174 carried by the wire-feeding carrier 51. As shown in FIG. 20, when the carriers 51 and 52 meet at the center of the shed, the actuator 174 displaces the operator 173 rearwardly, retracting the head 158 from between the offset portions 156.

Retraction of the head permits the jaws to close upon the tip of the nozzle 104, and as the carriers 51 and 52 separate on their return movement, the jaws slide off of the tip of the nozzle 104 and engage the projecting end of the wire W, firmly gripping the same and withdrawing it through the shed towards the right. When the wire is drawn entirely through the shed, the jaw opening actuator 171 engages the lever 165 to open the jaws as described above. Thus, the loom operates to automatically lay-in a length of wire into the shed an to position the same with the proper tails projecting from the opposite sides of the shed.

Since the operation of the shear and the jaws are automatically controlled by displacement of the carriers, it is a simple adjustment to vary the length of weft wire laid-in when varying the width of the wire cloth being woven. When varying the width of the wire cloth to be woven, both the timing and the throws of the cranks 55 and 56 are adjusted by the adjustments shown in FIG. 1 to accommodate the change in the width; and the shearing cam 131 and the jaw-opening actuator 171 are simply adjusted on the lay frame 33 to positions corresponding to the width of the cloth being woven so as to leave the proper length tails projecting from the opposite sides of the sheds.

The jaw-closing mechanism operates automatically upon engagement of the jaw-closing actuator 174 with the operator 173 regardless of the width of the cloth, and the wire-feeding cam 128 is positioned to feed the wire when the leading end of the carrier 51 is within the shed, regardless of the width of the cloth being woven. Thus, adjustment of the loom for weaving different widths of cloth is a simple but effective procedure.

*Selvage-Forming Device*

In accordance with the invention, the selvage-forming device of the present invention is mounted on the main frame of the loom substantially independently of the reed, and is actuated by the conventional movement of the reed during the beat-up of the weft to tuck the projecting ends of the weft wire into the selvage after the change of shed is accomplished in the conventional manner by the heddle frames.

As best shown in FIGS. 4 through 13, the selvage-forming devices, which operate upon the tail ends of the weft wire projecting from the opposite sides of the shed, are mounted on a cross rail 201 which spans between the side pieces of the main frame 31. Complementary devices are mounted in registry with the selvage of the cloth at both the right-hand and left-hand side of the loom. Since the devices are complementary in all respects, only the left-hand device has been illustrated in detail, it being understood that the right-hand device operates in a similar manner.

The left-hand selvage-forming device 202 includes an upstanding standard 203 which supports a mount for the device, in the present instance a plate 204 positioned underlying the wire cloth forwardly of the fell at the forward end of the shed S. As shown in FIGS. 8 and 12, the plate 204 is mounted on an upstanding pivot 205 and is biased in a clockwise direction by a spring 206 toward a rearward position shown in FIG. 12 wherein the free rearward end of the plate projects rearwardly of the fell of the cloth. The rearward position is determined by a stop pin 207 projecting upwardly from the standard 203 to engage the forward edge of the plate 204, as shown in FIG. 12. When the reed 46 is at its forward limit position, as shown in FIG. 8, an abutment 209 on the reed engages the free rearward edge 210 of the plate 204 and displaces it counterclockwise on the pivot 205 against the bias of the spring 206.

The plate 204 mounts at its rearward end a tucker element 212 which is rotatable with an upstanding tucker shaft 213 journaled in the plate 204, as indicated at 214 (see FIG. 7). A tucker operator 215 is mounted on the shaft 213 and includes a cam portion 216 and an abutment 217. As shown, the abutment 217 projects laterally from the lower part of the cam portion 216 and is operable to engage a stop screw 219 projecting upwardly from the plate 204. The shaft 213 is biased counterclockwise to urge the abutment 217 against the stop screw 219, in the present instance by a spring 221 mounted below the plate 204. The tucker 212 has a wiping element 222 with a groove 223 in its forward face for engaging the tail of the weft wire W projecting from the shed. To insure engagement of the wire W in the groove 223, a fabric guide 225 is mounted on the plate 204 by a spacer block 226 so that the guide 225 is in horizontal registry with the groove 223 of the tucker 212. As shown in FIGS. 6 and 7 the cloth guide 225 consists of a pair of spaced plates operable to engage over and under respectively the edge of the wire cloth.

In the operation of the selvage-forming mechanism, as the reed 46 beats up the weft wire, designated W–2 in FIGS. 9 to 11, into the fell as the shed closes, the abutment 209 on the reed displaces the plate 204 forwardly to position the tucker 212 as shown in full lines in FIGS. 8 and 9. As the reed is retracted, the plate 204 swings rearwardly under the action of the biasing spring 206 on the pivot 205, causing the tucker element 212 to bear against the tail of the wire W–1 projecting from the shed, bending it forward as shown in FIG 10. The pivotal mounting of the plate 204 provides during the rearward swing of the tucker element, a positive inward force upon the tail, insuring a sharp bend at the fell to position it along the selvage. Further retraction of the reed causes the tucker shaft 213 to rotate against the bias of its spring 221, rotating the wiping element 222 clockwise to engage the tail of the wire W–1 in the groove 223. As shown in FIG. 11, further clockwise rotation of the tucker shaft 213 displaces the tail of the wire into the new shed which is being opened as the reed 46 retracts. Upon further retraction of the reed, the wiper shaft is free to return in a clockwise direction to the position shown in full lines in FIGS. 10, leaving the tail of the wire W–1 positioned within the shed substantially at the angle shown in FIG 11. The tail remains in this position until the subsequent beat-up, at which time the reed carries the next weft wire into the fell and the next wire bends the tail of the wire W–1 into parallel relation with the body of the wire W–1 to form the selvage, as shown on the previously inserted weft wires in FIGS. 9 to 11 inclusive.

In accordance with the invention, the tucker mechanism is operated automatically by the conventional movement of the reed during beat-up. To this end, a tucker pawl 231 carried by the lay frame 33 cooperates with the cam portion 216 to operate the tucker 212. As best shown in FIG. 6, the tucker pawl is pivotally supported at 232 upon a pawl support 233 secured to the lay frame 33 as indicated at 234. The pawl 231 depends downwardly from its pivot under its own weight as shown in FIG. 6 and is free to pivot clockwise by reason of the cutout 236 in the support 233. Counterclockwise pivotal movement of the pawl 231 beyond the position shown in FIG. 6 is prevented by engagement of the upper end of the pawl with a stop surface 237 on the support 233.

The freedom for pivotal movement of the pawl 231 allows the pawl to ride over the cam portion 216 during the forward movement of the lay frame 33 towards the forward limit position indicated at 231–1 in FIG. 6. Upon retractive movement of the lay frame, the pawl 231, as indicated in broken lines in FIG. 10, engages the cam portion 216 to rotate the tucker shaft 213 and effect the clockwise rotary movement of the tucker 212 discussed above to the position shown in FIG. 11, at which point the pawl 231 rides off the end of the cam portion 216, permitting the tucker 212 to return to its normal position indicated in broken lines in FIG. 11. The limit position of the pawl is indicated at 231–2 in FIG. 6. Thus, the reciprocating movement of the lay frame 33 automatically operates the tucker assembly to form the selvage by tucking the projecting tail ends of the weft wires W into the selvage during retractive movement of the lay frame after the shed has been changed by the heddle frames 38 and 39.

The selvage-forming mechanism of the present invention is readily adapted to be changed to accommodate the weaving of different widths of wire cloth. When changing the width of the cloth, the standard 203 is adjusted laterally on the cross rail 201 so as to be in vertical registry with the edge of the width of wire cloth to be woven. In the adjusted position, the body of the tucking element 212 engages the selvage edge of the cloth in its normal position so that when it is displaced rearwardly by the abutment 209 on the reed and is permitted to return to its normal position, it wipes the tail end of the weft wire forwardly as shown in FIG. 10. In order to accommodate the new position of the tucker assembly, an abutment 209 is provided on the reed to engage the rearward edge of the plate 204 as shown in FIG. 8. In addition, the pawl support 233 is also adjusted on the lay frame to cause the pawl 231 to engage the cam portion 216 during the retractive movement of the lay frame. The tucker standard and the pawl support at the right-hand side of the loom are indicated at 203–1 and 233–1 respectively in FIG. 1. Accordingly, it is a relatively simple adjustment to convert the loom to weaving wire cloth of differing widths, all of the adjustments being made directly on the loom in a relatively accessible area thereof. It should be noted that the reed need not be adjusted to the precise width of the cloth being woven, since abutments may be mounted to overlie the reed dents in the area of the edge 210 of the tucker assemblies. In practice, it has been found that the abutments 209 may be formed by the reed wires themselves, instead of using a separate piece as shown in the drawings. In this case, there is no adjustment at all in the reed when changing cloth widths. This ease of adjustment enables the looms to be converted with a minimum of down-time by a loom fixer of ordinary skill and competence.

It is apparent that the present invention provides mechanism for converting a standard shuttle-type loom to a shuttleless loom with a minimum expenditure for parts and labor, enabling the mill to obtain the advantages of shuttleless operation without going to the expense of replacing and disposing of entirely functional looms which have considerable remaining useful life. The replacement parts are of relatively simple construction and operation so that they may be installed and maintained by loom fixers without the need for substantial retraining. In most respects, the loom operates in the manner conventional to shuttle-type looms so that the loom operators may undertake the operation of the loom with a minimum amount of retraining. Thus, the present invention provides a highly economic conversion of a mill from a shuttle-type to shuttleless operation.

While a particular embodiment of the present invention has been herein illustrated and described, it is not intended to limit the invention to such disclosure, but changes and modifications may be made therein and thereto within the scope of the following claims.

I claim:

1. In a loom for weaving wire cloth having a reciprocating lay frame, heddle means for forming a series of sheds, means carried by said lay frame for inserting a strand of weft wire into each shed of said series, and a reed mounted on said lay frame rearwardly of said weft wire-inserting means to beat the weft wire inserted thereby into the fell of the cloth at the forward end of the shed upon forward displacement of said lay frame, wire supply means mounted remotely of said lay frame and adapted to feed wire in continuous length to said inserting means, said inserting means comprising a wire-feeding carrier mounted at one side of said shed and adapted to be projected inwardly of said shed to the midpoint thereof to insert the leading end of the wire thereinto, and a wire-pulling carrier mounted at the other side of said shed and adapted to be projected inwardly of said shed to the midpoint thereof and to grip and pull the wire end inserted by said wire-feeding carrier through and out of said shed upon retraction of said wire-pulling carrier, the improvement where:

said wire-feeding carrier has a hollow nozzle fixed to its forward end and wire-feeding mechanism, said wire-supply means adapted to direct a strand of wire through said wire-feeding mechanism and said nozzle successively, said wire-feeding mechanism including clamp means operable to permit forward displacement of the wire relative to said feeding mechanism and said nozzle but to prevent rearward movement of the wire through said mechanism, means to sever the wire at said nozzle upon retraction of said carrier from said shed, and means to actuate said feeding mechanism to cause said severed end of wire to project from said nozzle upon insertion of said carrier into a succeeding shed to enable gripping and pulling of said wire end by said wire-pulling carrier.

2. Apparatus according to claim 1 wherein said wire-feeding mechanism comprises a block having a longitudinal bore to receive the strand of wire, said block mounting said clamping means in engagement with said strand, and in turn being mounted for longitudinal displacement in said wire-feeding carrier relative to said nozzle.

3. Apparatus according to claim 2 including means to displace said block comprising an operator connected to said block and projecting laterally beyond said carrier, said actuating means comprising an element fixed to said lay frame in the path of said operator to engage said operator and thereby displace said block forwardly toward said nozzle upon forward travel of said carrier within said shed, and operable to afford rearward displacement of said block from said nozzle upon rearward travel of said carrier within said shed.

4. Apparatus according to claim 3 wherein said block includes a tubular member projecting rearwardly from said clamping means through and beyond the end of said carrier, said end of the carrier supporting said operator for pivotal displacement thereon, one end of said operator being connected to said tubular member and the other end of said operator operable to engage said actuating element as said carrier is advanced within the shed.

5. Apparatus according to claim 2 wherein said clamp means comprises a clamping plate mounted in said block at one side of the bore, a clamping roller mounted in said block at the other side of said bore, and means guiding and biasing said roller for movement in a path at an angle to the said bore to resiliently engage the wire toward the rearward end of said block so that forward movement of said wire through said block displaces said roller against said bias to afford relative movement of said wire in said block when the tension on said wire overcomes said bias, and rearward tension on said wire supplements said bias to firmly clamp said roller against said wire to prevent rearward relative movement of said wire in said block.

6. Apparatus according to claim 5 wherein said means to guide and bias said roller comprises a bearing plate confronting said clamping plate and converging rearwardly at an angle toward said clamping plate, and a push rod engaging said roller and biased rearwardly to urge said roller rearwardly between said clamping plate and said bearing plate.

7. Apparatus according to claim 6 wherein said push rod includes a spring effecting said rearward bias and means to adjust the tension on said spring to vary the bias on said roller and accordingly the tension required forwardly on said wire to displace the same forwardly between the roller and the clamp plate.

8. Apparatus according to claim 1 wherein said means to sever the wire at said nozzle comprises a shear carried by said wire-feeding carrier and cooperable with said nozzle to sever the wire at said nozzle, and means mounted on said frame to displace said shear automatically upon retraction of said carrier from said shed and provide a severed tail end on the wire remaining in said shed projecting laterally from said shed.

9. Apparatus according to claim 8 wherein said shear comprises a member pivoted to said carrier and spring means biasing said member away from engagement with said nozzle, said means to actuate said shear comprising a cam fixedly mounted on said frame in the path of said member to engage and displace said shear member into engagement with said nozzle to effect shearing of the wire.

10. An apparatus according to claim 1 wherein said wire-pulling carrier comprises a pair of gripper jaws mounted on the inner end thereof operable between an open and a closed position, said jaws in the open position thereof operable to engage over said nozzle when said carriers are at their inner limit position at the center of the shed, and control means for said jaws operable to effect closure of said jaws on said nozzle and, upon retraction of said carriers, to engage the wire projecting from said nozzle and pull the same outwardly of said shed; and operable, upon displacement of said wire-pulling carrier from said shed, to open said jaws to release the wire with its leading end projecting from the side of the shed.

11. Apparatus according to claim 10 wherein said gripper jaws are biased toward one another and said control means includes a cam positioned intermediate said jaws and displaceable at the second position of said carrier to engage said jaws and separate the same to thereby release said wire and operable at the first position of said carrier to disengage said jaws and effect closing movement thereof under their bias.

12. Apparatus according to claim 11 wherein said control means comprises a lever connected to said cam and projecting laterally from said carrier, an actuator mounted on said lay frame in the path of said lever in the closed position of said jaws to engage said lever upon retraction of said carrier from said shed to thereby displace said cam into engagement with said jaws to open the same.

13. Apparatus according to claim 11 wherein said control means includes a cam operator mounted on said cam and offset from said jaws, and an actuator carried by said wire-feeding carrier operable when said wire-feeding carrier and said wire-pulling carrier are in their inner limit positions to engage said operator and displace said cam to effect closing of the jaws over the nozzle mounted on said wire-feeding carrier.

14. Apparatus according to claim 11 wherein said jaws comprise leaf spring elements rigidly mounted to said wire-pulling carrier and projecting inwardly therefrom and biased toward engagement with one another at their inner ends to clamp the wire therebetween.

15. Apparatus according to claim 14 wherein said jaws include forward portions which are offset inwardly toward one another, said cam having a head portion mounted for longitudinal displacement between said jaws and operable when engaged between said offset portions to displace said jaws outwardly against their bias and when displaced rearwardly from said offset portions to afford closing of said jaws by their bias.

16. In a loom for weaving wire cloth having a stationary main frame, a reciprocating lay frame, heddle means for forming a series of sheds, means for inserting a length of weft wire into each shed of said series with short tail ends of said wire projecting laterally from the sides of said shed, a reed mounted on said lay frame to beat the weft wire inserted thereby into the fell of the cloth at the forward end of the shed upon displacement of said lay frame to its forward limit position, and selvage-forming means to tuck the tail ends of said weft wire into the selvages of the cloth at the sides thereof; the improvement wherein said selvage-forming means comprises,
 a support stand mounted on said main frame adjacent the selvage at the fell of the cloth,
 a tucking element,
 a journal mounting said tucking element for pivotal movement about axis perpendicular to the cloth,
 means mounting said journal for movement on said stand between a rearward limit position abutting the selvage rearwardly of the fell in the path of said reed and the forward limit position forwardly of said fell beyond the path of said reed,
 means operable upon displacement of said lay frame to its forward limit position to displace said journal to its forward limit position, means operable upon retraction of said lay frame to displace said journal rearwardly to its rearward limit position to engage the tucking element against the projecting tail of the weft wire to bend the latter rearwardly along the selvage,
 a wiping element on said tucking element in horizontal registry with said bent tail, and
 means to rotate said tucking element on its pivot to cause said wiping element to engage said tail and tuck it inwardly of the shed to form a selvage.

17. Apparatus according to claim 16 wherein said journal is pivotally mounted for swinging movement between said rearward position and said forward position, said forward position being spaced outwardly from said selvage forwardly of the fell.

18. Apparatus according to claim 17 wherein said journal is mounted on a plate pivoted to said stand, and including a cloth guide on said plate in horizontal registry with said wiping element, said cloth guide engaging the wire cloth forwardly of said fell to insure horizontal registry of said wiping element with said tail in the fell.

19. Apparatus according to claim 18 wherein said means to displace said journal rearwardly comprises a spring member connected intermediate said plate and said stand to urge said plate toward its rearward limit position.

20. Apparatus according to claim 18 wherein said means to displace said plate forwardly comprises an abutment means carried by said lay frame engageable with said plate in the forward limit position of said lay frame to pivot the same forwardly.

21. Apparatus according to claim 16 wherein said means to displace said tucking element on its axis comprises a cam member mounted on said tucking element and a pawl carried by said lay frame operable upon retractive movement of said lay frame to engage said cam and rotate said tucking element about its axis.

22. Apparatus according to claim 21 wherein said pawl is pivotally mounted on said lay frame to swing out of the path of said cam upon forward movement of said lay frame to position said pawl in front of said cam at the forward limit position of said lay frame, and spring means to bias said tucking element toward a position wherein the wiping element is remote from the selvage on the side of the tucking element opposite the side which normally engages the selvage in the normal rearward position of said tucking element.

References Cited
UNITED STATES PATENTS

| 2,220,924 | 11/1940 | Von Holtz | 139—127 |
| 2,702,566 | 2/1955 | Houghton | 139—127 |
| 2,737,208 | 3/1956 | Harter | 140—24 |
| 2,849,029 | 8/1958 | Webber et al. | 139—127 |
| 3,081,798 | 3/1963 | Stauffer et al. | 139—122 |

CHARLES W. LANHAM, *Primary Examiner.*

LOWELL A. LARSON, *Assistant Examiner.*

U.S. Cl. X.R.

139—122, 127; 140—10, 24